United States Patent
Baddam et al.

(10) Patent No.: US 12,553,360 B2
(45) Date of Patent: Feb. 17, 2026

(54) AIR TURBINE STARTER WITH CONTAINMENT ASSEMBLY

(71) Applicant: Unison Industries, LLC, Jacksonville, FL (US)

(72) Inventors: Nagendra Baddam, Bengaluru (IN); Sharad Pundlik Patil, Bengaluru (IN); Shiloh Montegomery Meyers, Miamisburg, OH (US); Dattu GV Jonnalagadda, Bengaluru (IN); Merin Sebastian, Bengaluru (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 18/762,978

(22) Filed: Jul. 3, 2024

(65) Prior Publication Data

US 2024/0384663 A1    Nov. 21, 2024

Related U.S. Application Data

(63) Continuation of application No. 18/319,868, filed on May 18, 2023, now Pat. No. 12,084,980.

(51) Int. Cl.
*F01D 19/00* (2006.01)
*F01D 25/24* (2006.01)
*B33Y 80/00* (2015.01)

(52) U.S. Cl.
CPC .............. *F01D 19/00* (2013.01); *F01D 25/24* (2013.01); *B33Y 80/00* (2014.12); *F05D 2240/14* (2013.01); *F05D 2300/175* (2013.01)

(58) Field of Classification Search
CPC ...... F01D 11/12; F01D 11/122; F01D 11/125; F01D 11/127; F01D 21/045; F02C 7/277; F05D 2240/14; F05D 2260/85; F05D 2300/505
See application file for complete search history.

(56) References Cited

U.S. PATENT DOCUMENTS

| | | | |
|---|---|---|---|
| 3,261,228 A * | 7/1966 | Rothman | F01D 21/045 74/609 |
| 5,163,809 A | 11/1992 | Akgun et al. | |
| 6,830,428 B2 | 12/2004 | Le Biez | |
| 7,866,939 B2 | 1/2011 | Harper et al. | |
| 8,932,002 B2 | 1/2015 | Makulec et al. | |
| 9,598,978 B2 | 3/2017 | Hoyland | |
| 9,828,876 B2 | 11/2017 | Kappes | |
| 10,167,727 B2 | 1/2019 | Vargas et al. | |

(Continued)

FOREIGN PATENT DOCUMENTS

| | | |
|---|---|---|
| CN | 109113810 B | 7/2019 |
| EP | 0257466 B1 | 3/1992 |

(Continued)

*Primary Examiner* — Courtney D Heinle
*Assistant Examiner* — Danielle M. Christensen
(74) *Attorney, Agent, or Firm* — McGarry Bair PC

(57) ABSTRACT

An air turbine starter that includes a housing defining an interior having a primary air flow path. A rotatable turbine member located in the interior includes a plurality of circumferentially spaced blades that extend into the primary air flow path. A containment assembly couples to the housing and circumscribes at least a portion of the plurality of circumferentially spaced blades. The containment assembly includes a hollow tube and a laminate.

20 Claims, 10 Drawing Sheets

(56) References Cited

U.S. PATENT DOCUMENTS

| | | | |
|---|---|---|---|
| 10,422,024 B2 | 9/2019 | Hardy et al. | |
| 10,495,182 B2 | 12/2019 | Nayak et al. | |
| 10,655,500 B2 | 5/2020 | Heeter | |
| 10,927,687 B2 | 2/2021 | Vargas et al. | |
| 11,149,584 B2 | 10/2021 | Crall et al. | |
| 11,391,297 B2 | 7/2022 | Cheung | |
| 11,499,448 B2 | 11/2022 | Yadav et al. | |
| 2012/0082541 A1 | 4/2012 | Macchia et al. | |
| 2020/0308986 A1 | 10/2020 | Slayter | |
| 2020/0407825 A1 | 12/2020 | Matsui et al. | |
| 2021/0301727 A1* | 9/2021 | Asdev | F02C 7/277 |
| 2021/0301728 A1 | 9/2021 | Nayak et al. | |
| 2021/0372328 A1* | 12/2021 | Asdev | F02C 7/277 |

FOREIGN PATENT DOCUMENTS

| | | |
|---|---|---|
| EP | 1312761 B1 | 5/2003 |
| EP | 3656988 A1 | 5/2020 |
| EP | 3715588 B1 | 9/2020 |
| KR | 20180123636 A1 | 11/2018 |

* cited by examiner

AIR TURBINE STARTER WITH CONTAINMENT ASSEMBLY

CROSS-REFERENCE TO RELATED APPLICATION(S)

This application is a continuation application of U.S. patent application Ser. No. 18/319,868, filed May 18, 2023, U.S. Pat. No. 12,084,980, granted Sep. 10, 2024, which is incorporated herein by reference in its entirety.

TECHNICAL FIELD

The disclosure generally relates to a containment system for rotating components, specifically for a containment system circumscribing at least a portion of a plurality of blades in an air turbine starter.

BACKGROUND

A turbine engine, for example a gas turbine engine, is engaged in regular operation to an air turbine starter (ATS). The ATS is often mounted near the turbine engine and the ATS can be coupled to a high-pressure fluid source, such as compressed air, which impinges upon a turbine rotor in the ATS causing it to rotate at a relatively high rate of speed. The ATS includes an output shaft that is driven by the turbine rotor, typically through a reducing gear box, where the output shaft provides rotational energy to a rotatable element of the combustion engine (e.g., the crankshaft or the rotatable shaft) to begin rotating. The rotation by the ATS continues until the combustion engine attains a self-sustaining operating rotational speed.

BRIEF DESCRIPTION OF THE DRAWINGS

A full and enabling disclosure of the present subject matter, including the best mode thereof, directed to one of ordinary skill in the art, is set forth in the specification, which makes reference to the appended Figs., in which.

DETAILED DESCRIPTION

Figure 1:
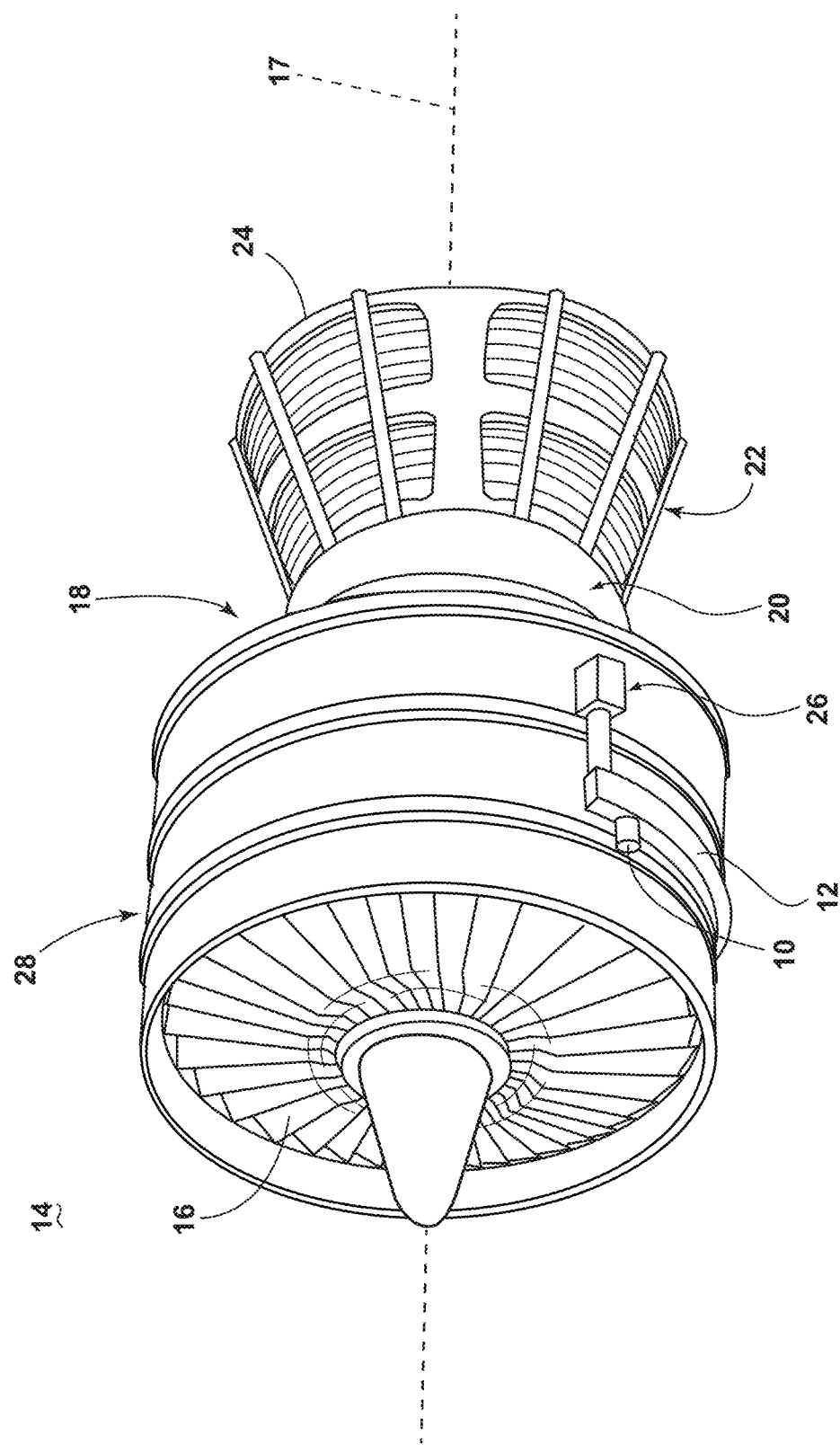
FIG. 1 is a schematic illustration of a turbine engine with an air turbine starter, in accordance with various aspects described herein.

Aspects of the present disclosure are directed to a turbine engine with an air turbine starter that includes a containment structure for retaining, containing, or otherwise hindering or retarding the expulsion of objects or components from the air turbine starter. While the examples described are directed to application of a turbine engine and a starter, the disclosure can be applied to any implementation of a driving mechanism that generates rotational motion at a driving output and provides the rotational motion to another piece of rotating equipment. For purposes of illustration, the present disclosure will be described with respect to a starter for an aircraft turbine engine, however, the starter can have various applications including starting a gas turbine engine.

The containment assembly as described surrounds a turbine member or turbine rotor and is configured to both contain objects within the interior of the air turbine starter as well as dissipated energy from objects that contact the containments assembly.

A conventional air turbine starter (ATS) includes a turbine rotor that rotates under pressurized air to transmit enough speed and torque to start a turbine engine. A containment shield can be mounted within the ATS to provide strength and rigidity to the ATS and to retain, contain, prevent, or otherwise reduce the expulsion of ATS components, including, but not limited to, turbine rotors, loose components or fragments, additional rotary components, or the like. The metal containment shield contributes significantly to weight and has limited deformation capabilities for absorbing impacts, kinetic energy, or the like. Containment systems typically include a solid containment band surrounding the turbine rotor. The solid containment band can be made from metal. While metal is often the selected material for implementation, the containment band need not be made from metal. The solid, single material containment band typically has a high density, which contributes to the overall weight of the containment system and the aircraft.

An alternative approach is to use a hybrid containment assembly having a first ring and a second ring having different materials or different combinations of materials. The containment assembly strikes a balance between the weight of the containment band while preserving or improving the specific energy absorption capability of the containment assembly. The different materials can be the: same metals with different properties; different metals; metals and non-metals, such as plastics or carbon fiber; or different non-metals, or combinations thereof. While the first ring and the second ring are the described hybrid implementation, more than two rings are possible, and the rings can be circular or non-circular.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction extending towards or away from a common center. For example, in the overall context of a turbine engine, radial refers to a direction along a ray extending between a center longitudinal axis of the turbine engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, fastened, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the term "arc length" is a measured distance along a curved surface. The arc length can, for example, be calculated with a radius and central angle.

As used herein, the term "additive manufacturing" generally refers to manufacturing processes wherein successive layers of material(s) are provided on each other to "build-up," layer-by-layer, a three-dimensional component. The successive layers generally fuse together to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Suitable additive manufacturing techniques in accordance with the present disclosure include, for example, Directed Energy Deposition (DED), Fused Deposition Modeling (FDM), Selective Laser Sintering (SLS), 3D printing such as by inkjets and laser jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The Digital Light Processing (DLP) can include a 3D DLP printer having a transparent vat or transparent tank, a building platform, and a light assembly. The transparent vat or transparent tank can contain, for example, a photopolymer resin.

The DLP building platform can couple to, for example, a motor or other mechanisms permitting the movement of the building platform in one or more dimensions, such as raising or lowering the building platform from or toward the resin in the vat or tank.

A DLP printed component can couple to a lower portion of the building platform facing the vat or tank. The lighting assembly is located, at least in part, below the vat or tank. The lighting assembly can include at least one light source and at least one optical reflector or refractor such as, for example, a deflection mirror or at least one lens.

A controller coupled to or included in the DLP printer can control one or more aspects of the DLP printer such as, for example, the position of the DLP building platform or the intensity, duration, or orientation of the lighting source.

In addition to using a direct metal laser sintering (DMLS) or direct metal laser melting (DMLM) process where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

Referring to FIG. 1, an air turbine starter motor or air turbine starter 10 is coupled to an accessory gear box (AGB) 12, also known as a transmission housing, and together are schematically illustrated as being mounted to a turbine engine 14, such as a gas turbine engine. This assembly is commonly referred to as an Integrated Starter/Generator Gearbox (ISGB). The turbine engine 14 includes an air intake with the fan 16 that supplies air to a compression region having a high-pressure compression region 18. The fan 16 can define an engine axis of rotation 17. The air intake with a fan 16 and the compression region collectively are known as the 'cold section' of the turbine engine 14. The cold section is positioned upstream of a combustion section of the turbine engine 14. The high-pressure compression region 18 provides a combustion chamber 20 of the combustion section with high-pressure air. In the combustion chamber 20, the high-pressure air is mixed with fuel and combusted. The hot and pressurized combusted gas passes through a turbine region, illustrated as having a high-pressure turbine region 22 and a low-pressure turbine region 24 before exhausting from the turbine engine 14. As the pressurized gases pass through a high-pressure turbine (not shown) of the high-pressure turbine region 22 and a low-pressure turbine (not shown) of the low-pressure turbine region 24, the turbines extract kinetic energy from the flow of the gases passing through the turbine engine 14. The high-pressure turbine of the high-pressure turbine region 22 can be coupled to the compression mechanism (not shown) of the high-pressure compression region 18 by way of a shaft to power the compression mechanism. The low-pressure turbine can be coupled to the fan 16 of the air intake by way of a shaft to power the fan 16.

The AGB 12 is coupled to the turbine engine 14 at either the high-pressure or low-pressure turbine region 22, 24 by way of a mechanical power take-off 26. The mechanical power take-off 26 contains multiple gears and means for mechanical coupling of the AGB 12 to the turbine engine 14. Under normal operating conditions, the mechanical power take-off 26 translates power from the turbine engine 14 to the AGB 12 to power accessories of the aircraft, such as, but not limited to fuel pumps, electrical systems, and cabin environment controls. The air turbine starter 10 can be located radially outside of a fan casing 28. That is, the air turbine starter 10 can be located radially outside of the air intake region containing the fan 16. Alternatively, it is contemplated that in a differing and non-limiting example, the air turbine starter 10 can be located outside of the core near the high-pressure compression region 18, where the air turbine starter 10 can be coupled to a transfer gear box (not shown) or an accessory gear box (not shown). Further, any location for the air turbine starter 10 is contemplated where the air turbine starter 10 can be coupled to the turbine engine 14.

Figure 2:
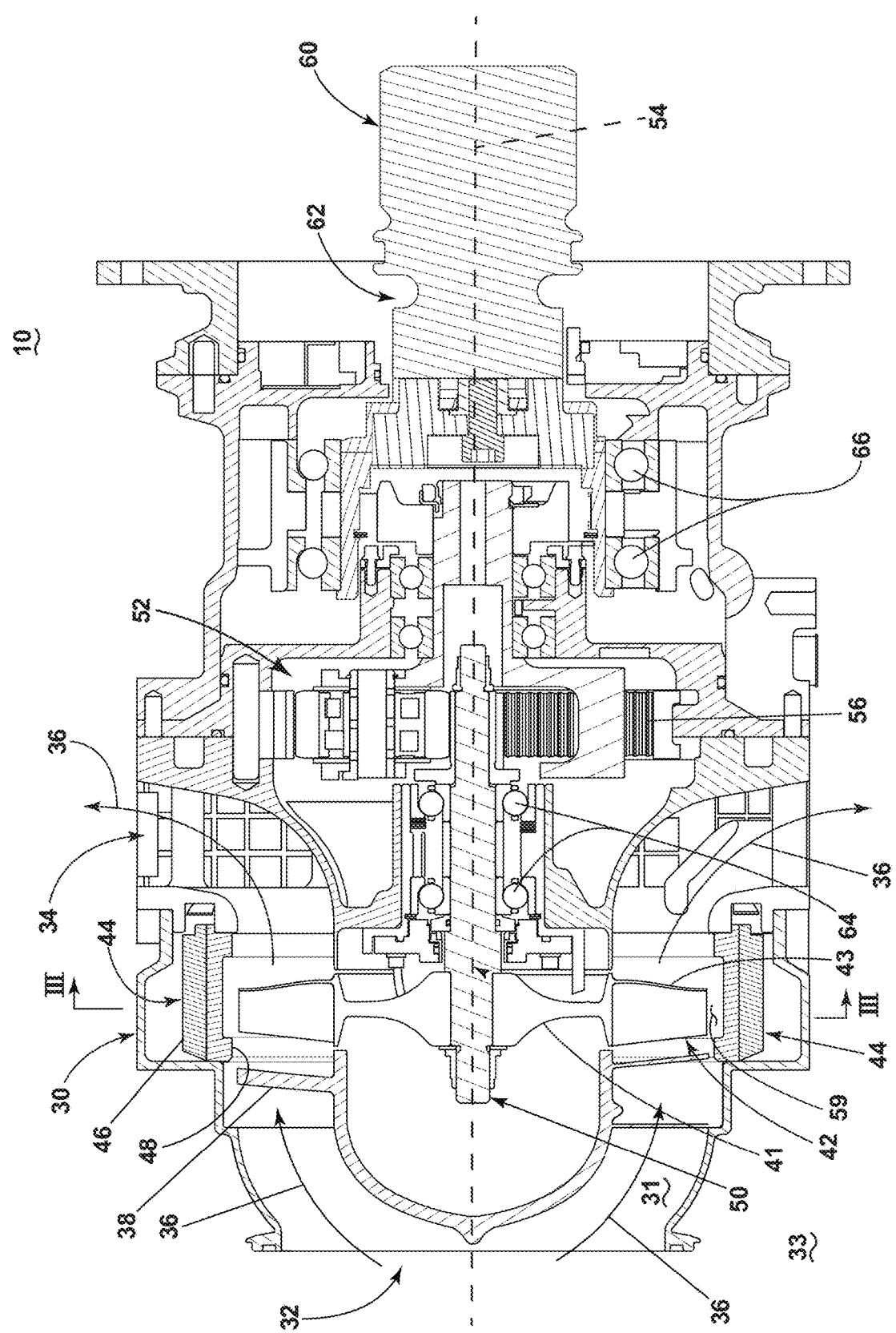
FIG. 2 is a schematic cross-sectional view of a portion of the air turbine starter of FIG. 1, in accordance with various aspects described herein.

FIG. 2 is a schematic cross section of an exemplary air turbine starter 10 that can, for example, be included in FIG. 1. Generally, the air turbine starter 10 includes a housing 30 defining an interior 31 and an exterior 33 of the housing 30. A primary inlet 32 and a primary outlet 34 are also defined by the housing 30. A primary air flow path 36 through the interior 31 is illustrated schematically with arrows. The primary flow path 36 extends between the primary inlet 32 and the primary outlet 34 for communicating a flow of fluid, including, but not limited to gas, compressed air, or the like, therethrough. In one non-limiting example, the fluid is air, such as pressurized air, that is supplied from a pressurized air source, including but not limited to, a ground-operating air cart, an auxiliary power unit, or a cross-bleed start from an engine already operating.

The housing 30 can be formed in any suitable manner including, but not limited to, that it can be made up of two or more parts that are joined or otherwise coupled together or can be integrally formed as a single piece. A stator 38 can be included in the primary air flow path 36. The stator 38 can couple to or be formed as part of the housing 30 and include permeable portions. The permeable portions allow air in the primary flow path 36 to pass from the primary inlet 32, through the stator 38 and to a rotatable turbine member 42.

The turbine member 42 is located within the interior 31 of the housing 30. At least a portion of the turbine member 42 is disposed within the primary flow path 36 for rotatably extracting mechanical power from the flow of gas along the primary flow path 36. The turbine member 42 includes a rotor portion 41 and a plurality of circumferentially spaced blades 43.

A containment assembly 44 is disposed in the housing 30 surrounding at least a portion of the turbine member 42. More specifically, the containment assembly 44 circumscribes at least a portion of the plurality of circumferentially spaced blades 43 of the turbine member 42. That is, the containment assembly 44 can circumscribe at least a portion of an axially extending part of the plurality of circumferentially spaced blades 43 of the turbine member 42, where the axially extending part is a plurality of blade tips defined by the plurality of circumferentially spaced blades 43. The containment assembly 44 includes an outer ring illustrated as a first ring 46 and an inner ring illustrated as a second ring 48. The second ring 48 is concentrically arranged with the first ring 46.

The first ring 46 is made of a first material. The first material can be light weight, high strength material. As used herein, "light weight material" refers to a material that has a density less than 8 grams per cubic centimeter of material. As used herein, "high strength material" refers to a material with a tensile strength greater than 900 megapascals. More specifically, the "high strength material" can refer to a material with a tensile strength greater than 1400 megapascals. The first material can include, but is not limited to, one or more of titanium, nickel, chromium, steel, or aluminum. Benefits of the first material include a reduced weight when compared to traditional containment assembly design.

The second ring 48 includes a second material. The second material can be different than the first material. The second material can be a high strength material. It is also contemplated that the second material can be prestressed. During a contact event in which one or more objects contact the containment assembly 44 from the interior 31 of the air turbine starter 10, the energy from the one or more objects can be dissipated by relieving the prestress of the second material of the second ring 48.

A gap 59 is located between the second ring 48 and the plurality of circumferentially spaced blades 43. The gap 59 can change based on environmental or operational factors. During a contact event, the gap 59 distance is zero and one or more portions of the plurality of circumferentially spaced blades 43 contacts the containment assembly 44.

A drive shaft 50 is coupled to the rotating turbine member 42 so that the drive shaft 50 can provide a rotational output. An output gear assembly 52 coupled to the drive shaft 50 allows for the transfer of mechanical power from the turbine member 42 to the output gear assembly 52 via the rotational output of the drive shaft 50. The turbine member 42, the drive shaft 50, or a portion of the output gear assembly 52 can rotate about an axis of rotation 54.

The output gear assembly 52 can include a gear train 56. An output shaft 60 can be operably coupled to the turbine member 42 via the gear assembly 52 including the gear train 56 and a decoupler 62.

The output shaft 60 is operably coupled to the turbine engine 14 (FIG. 1) such that the output shaft 60 can rotate a portion of the turbine engine 14. It is contemplated that the output shaft 60 is operably coupled to one or more portions of the compression region or the turbine region. That is, the output shaft 60 can rotate one or more portions of the compression region or the turbine region.

A first bearing assembly 64 rotatably supports the drive shaft 50. Optionally, a second bearing assembly 66 can rotatably support the drive shaft 50, the output shaft 60, or both the drive shaft 50 and the output shaft 60. The second bearing assembly 66 can be located aft of the first bearing assembly 64. By way of non-limiting example, the second bearing assembly 66 can be provided adjacent the gear train 56 or the gear assembly 52.

Figure 3:
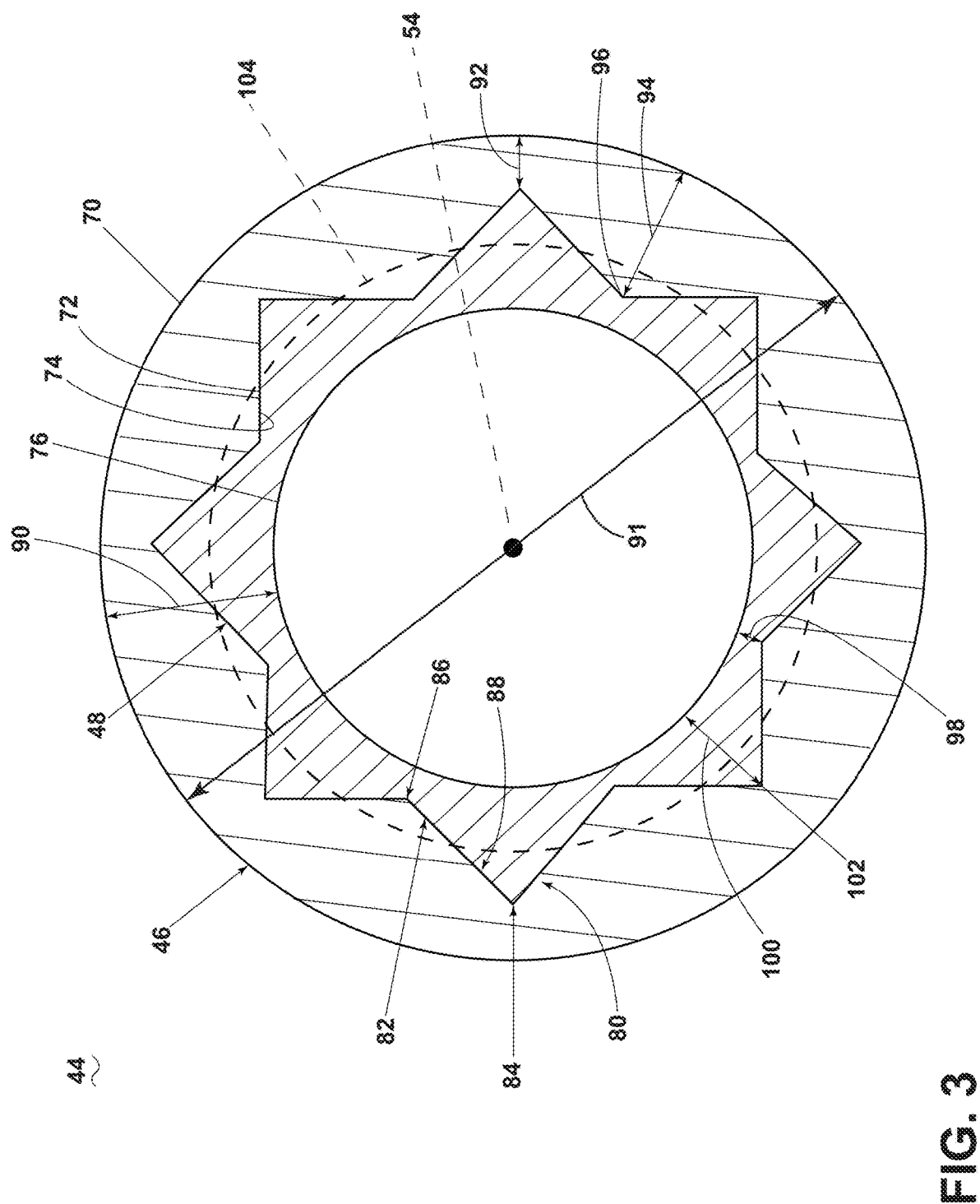
FIG. 3 is a schematic cross-sectional view of a containment assembly of the air turbine starter of FIG. 2 taken along line III-III of FIG. 2, in accordance with various aspects described herein.

FIG. 3 is a schematic cross-sectional view, looking along the axis of rotation 54, further illustrating a cross section of the containment assembly 44. The proportions of the first ring 46 and the second ring 48 have been exaggerated for clarity. Most notably, the thickness of the rings is exaggerated to be much larger when compared to the diameter of the first ring 46 and the second ring 48, when in actually, the thickness is much smaller. The first ring 46 of the containment assembly 44 has a first outer surface 70 and a first inner surface 72 spaced from the first outer surface 70. Similarly, the second ring 48 has a second outer surface 74 and a second inner surface 76 spaced from the second outer surface 74.

The first inner surface 72 confronts the second outer surface 74. The geometries of the first inner surface 72 and the second outer surface 74 define a mechanical surface interlock 80. The mechanical surface interlock 80 secures the first ring 46 and the second ring 48 together. As used herein, the term "mechanical surface interlock" refers to two confronting surfaces in contact with each other, where projections or recesses in the surfaces mechanically lock the two surfaces, and therefore the two objects, together. In other words, portions of a first surface that extend from or are recessed into the first surface have complementary geometries in the second surface that mechanically secure the first and second surfaces together. As used herein, the term "mechanical surface interlock" excludes mechanical fasteners passing through the first ring 46 and the second ring 48 as well as frictional interference or a press-fit of flat surfaces having no projections or recesses.

The mechanical surface interlock 80 can keep the first ring 46 from rotating with respect to the second ring 48 or the second ring 48 from rotating with respect to the first ring 46. As described in greater detail below, the mechanical surface interlock 80 can also provide a means of energy absorption or dissipation when the containment assembly 44 is contacted by an object or objects.

The mechanical surface interlock 80 fixes the first ring 46 and the second ring 48 using the geometries of the of the first inner surface 72 and the second outer surface 74. The geometries of the of the first inner surface 72 and the second outer surface 74 can include a variety of projections and recesses. As illustrated, by way of non-limiting example, the mechanical surface interlock 80 is a saw-toothed pattern, including a first set of projections 82 and a first set of recesses 84 at the first inner surface 72. A second set of recesses 86 at the second outer surface 74 receives the first set of projections 82. A second set of projections 88 at the second outer surface 74 are received by the first set of recesses 84.

While illustrated as uniform in spacing and location, the first set of projections 82 or the second set of projections 88 and the complementary first set of recesses 84 or second set of recesses 86 can be circumferentially located in non-uniform locations. Further, the size or shape of the first or second set of projections and complementary first or second set of recesses can vary. By way of non-limiting example, instead of having a cross section triangular shape, one or more of the first set of projections and the complementary second set of recesses can have a cross section that is a circle, oval, ellipse, square, regular or irregular polygon, or any combination thereof.

While the first set of projections 82 and the second set of projections 88 are illustrated, by way of example, as having eight (8) projections, any number of projections for each of the first set of projections 82 or the second set of projections 88 are contemplated; including a single projection. That is, it is contemplated in a different and non-limiting example, the mechanical surface interlock 80 can be defined by a single set of projections from the first ring 46 or the second ring 48 received by a single set of recesses in the other of the first ring 46 or the second ring 48.

A total thickness 90 of the containment assembly 44 can be measured from the first outer surface 70 to the second inner surface 76. The total thickness 90 can be in a range from 2.54 millimeters to 20.32 millimeters. More specifically, the total thickness 90 can be in a range from 5 millimeters and 18 millimeters. The range of the total thickness 90 provides both a weight benefit and a strength benefit.

An outer diameter 91 of the containment assembly 44 can be measured across the containment assembly 44 through the axis of rotation 54. That is, the outer diameter 91 is the distance between two locations of the first outer surface 70 of the first ring 46, wherein the measurement intercepts the axis of rotation 54. The total thickness 90 can be between 0.5% and 30% of the outer diameter 91.

If the total thickness 90 is less than 0.25 millimeters or 0.5% of the outer diameter 91, the containment assembly 44 may not absorb the desired amount of energy. Further, if the containment assembly 44 is thicker than 5.00 millimeters or 30% of the outer diameter 91, the desired predetermined weight of the structure may not be met.

The first ring 46 can have a first minimum thickness 92, which is the smallest thickness when measured radially along a direction extending from the axis of rotation 54. A first maximum thickness 94 is the greatest thickness measured radially along a direction extending from the axis of rotation 54 and is located at a farthest first extending portion 96. Therefore, the thickness of the first ring 46 can be between 0.20 millimeters and 7.65 millimeters. More specifically, the thickness of the first ring 46 can be between 0.5 millimeters and 5.5 millimeters. Additionally, or alternatively, the first minimum thickness 92 can be between 0.1% and 3% of the outer diameter 91. The first maximum thickness 94 can be between 0.1% and 9% of the outer diameter 91.

Similarly, the second ring 48 can have a second minimum thickness 98, which is the smallest thickness when measured radially along a direction extending from the axis of rotation 54. A second maximum thickness 100 is the greatest thickness measured radially along a direction extending from the axis of rotation 54, which is located at a second farthest extending portion 102. Therefore, the thickness of the second ring 48 can be between 0.20 millimeters and 7.65 millimeters. More specifically, the thickness of the first ring 46 can be between 0.5 millimeters and 5.5 millimeters.

Additionally, or alternatively, second minimum thickness 98 can be between 0.1% and 3% of the outer diameter 91. The second maximum thickness 100 can be between 0.1% and 9% of the outer diameter 91.

The location of the first minimum thickness 92 and the second maximum thickness 100 can abut one another. Similarly, the first maximum thickness 94 and the second minimum thickness 98 can be located at the same circumferential position.

A boundary 104 is illustrated in dotted lines that would form the boundary between the first ring 46 and the second ring 48 if the first ring 46 and the second ring 48 were smooth and includes no recesses or projections. Optionally, the boundary 104 can be defined at a location where the first ring 46 and the second ring 48 would abut with smooth surfaces and maintain a constant area or area within 20% of the area of the first ring 46 and second ring 48 with recesses or projections.

It is contemplated that the first set of projections 82 can extend past the boundary 104 into the second ring 48 a first distance that is 0%-50% of the total thickness 90. It is further contemplated that the second set of projections 88 can extend past the boundary 104 into the first ring 46 a second distance that is 0%-80% of the total thickness 90. It is yet further contemplated that the first distance or the second distance is in a range from 10% to 30% of the total thickness 90. Benefits of the range of the first distance or the second distance can include an increased surface area in contact between the first ring 46 and the second ring 48. Benefits of the ranges of the first distance or the second distance can result in the mechanical surface interlock 80 being an annular snap fit, snap joint, boss, or other fit in which energy can be dissipated during a contact event.

The mechanical surface interlock 80 secures the first ring 46 to the second ring 48. The mechanical surface interlock 80 can be a purely mechanical fit of the geometries of the first inner surface 72 and the second outer surface 74. Additionally, or alternatively, it is contemplated that in a differing and non-limiting example, the mechanical surface interlock 80 coupling the first ring 46 to the second ring 48 can include a thermal fit. That is, one or more of the first ring 46 or the second ring 48 is heated prior to interlocking the geometries of the first inner surface 72 and the second outer surface 74. A thermal fit can be a type of interference fit achieved by heating or cooling one or more of the portions or geometries that will be fit together.

While discussed as a thermal fit or a mechanical fit, any fit between the first ring 46 and the second ring 48, in addition or in place of a mechanical fit or a thermal fit, is contemplated. Optionally, one or more portions of the mechanical surface interlock 80 can include a magnetic material or chemical that retain or help retain the second ring 48 to the first ring 46.

In operation, compressed air is provided at the primary inlet 32 of the air turbine starter 10. The compressed air is directed by the stator 38 through the primary flow path 36. The turbine member 42 in the primary flow path 36 rotates in response to the compressed air flow. The turbine member 42 is operably coupled to the drive shaft 50, which provides rotational output that will result in starting the turbine engine 14.

During operation, if a contact event occurs between an object and the containment assembly 44, the containment assembly 44 can dissipate energy from the object. The first material and the second material can be selected based on material properties to help absorb the energy from the object, such as material fracture toughness. In addition to material selection, the second material of the second ring 48 can be compressed or prestressed. During contact, the energy of the object is reduced or dissipated to relieve the compression or prestress of the second ring 48. It is contemplated that between 1% and 50% of the energy of the object is dissipated when the compression or prestress of the second ring 48 is relieved.

Energy of the object is further dissipated by one or more of interference between the surface geometries, thermal fit of surface geometries, or shear between the surface geometries of the mechanical surface interlock 80 between the second material of the second ring 48 and the first material of the first ring 46.

The mechanical surface interlock 80 serves as a load-carrying member. That is, forces resulting from the energy of the contact of the object provided to the containment assembly 44 can be at least partially directed to the mechanical surface interlock 80, wherein the mechanical surface interlock 80 can bend, curve, compress, stretch, or otherwise deform in response to the force and therefore absorb a portion of the energy.

Interference fit, thermal fit, shear, or combination thereof between the first material and the second material can further reduce the energy of the object.

Energy of the object is yet further dissipated by the first ring 46, the second ring 48, or the first ring 46 and the second ring 48 by converting the energy of the object into shear energy, strain energy, or shear energy and strain energy.

Figure 4:
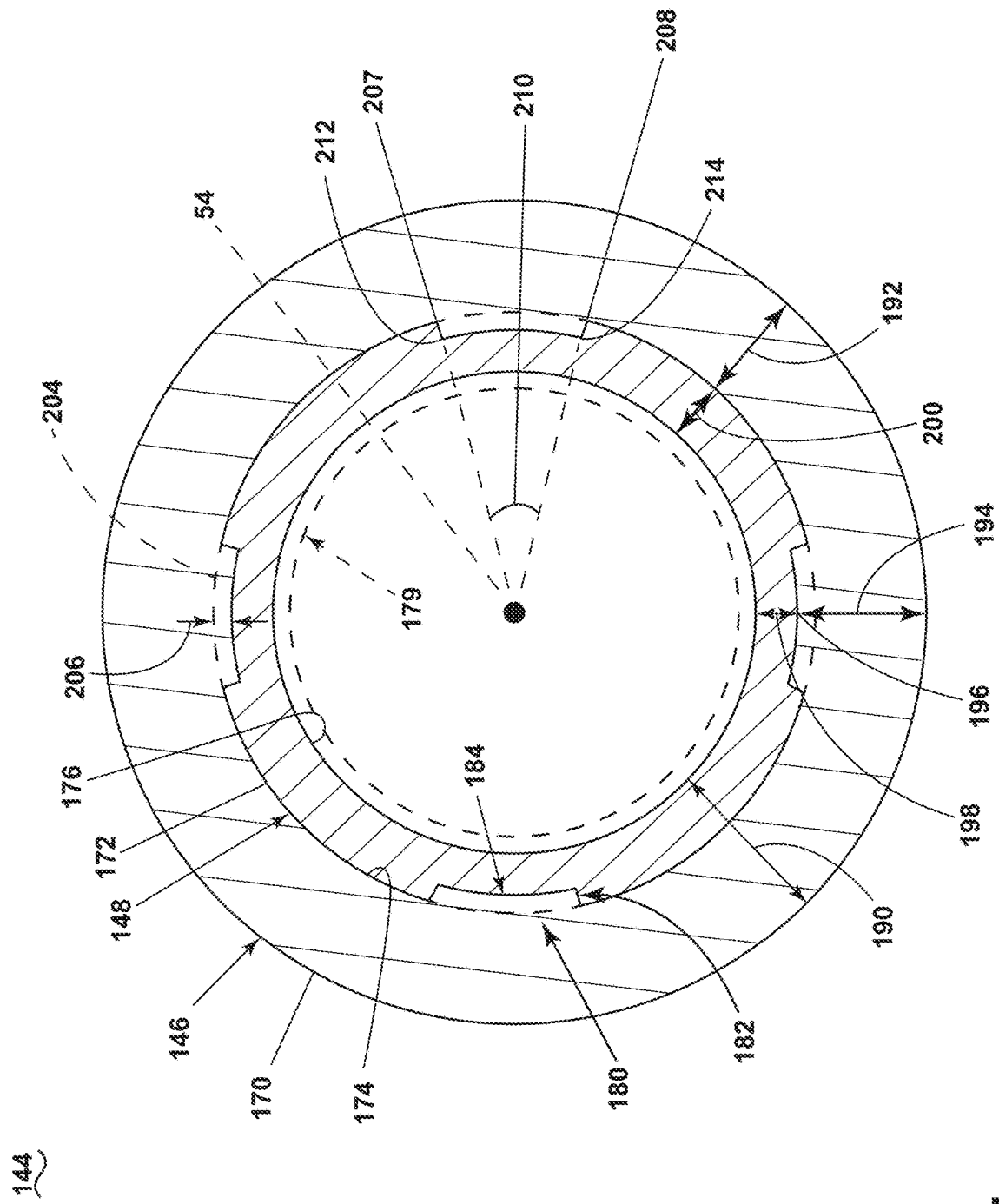
FIG. 4 is variation of the schematic cross-sectional view of FIG. 3, in accordance with various aspects described herein.

FIG. 4 is a variation of the cross section of FIG. 3 illustrating a containment assembly 144. The containment assembly 144 is similar to the containment assembly 44, therefore, like parts will be identified with like numerals increased by one hundred (100), with it being understood that the description of the like parts of containment assembly 44 applies to the containment assembly 144, unless otherwise noted.

A first ring 146 of the containment assembly 144 has a first outer surface 170 and a first inner surface 172 spaced from the first outer surface 170. Similarly, a second ring 148 has a second outer surface 174 and a second inner surface 176 spaced from the second outer surface 174.

The first inner surface 172 confronts the second outer surface 174. The geometries of the first inner surface 172 and the second outer surface 174 define a mechanical surface interlock 180. The mechanical surface interlock 180 secures the first ring 146 and the second ring 148 together. The geometries of the of the first inner surface 172 and the second outer surface 174 can include a variety of projections and recesses. As illustrated, by way of non-limiting example, the mechanical surface interlock 180 can includes tabs, illustrated as a set of projections 182 extending from the first inner surface 172 of the first ring 146. A set of recesses 184 at the second outer surface 174 receives the set of projections 182. The shape of the set of recesses 184 can be complementary to the set of projections 182, such that each projection of the set of projections 182 is received by a recess of the set of recesses 184.

While illustrated as uniform in spacing and location, the set of projections 182 and the complementary set of recesses 184 can be circumferentially located in non-uniform locations. Further, the size or shape of the cross section of the set of projections 182 can vary, wherein the set of recesses 184 can vary to complement the set of projections 182. By way of non-limiting example, instead of having a cross section having at, one or more of the first set of projections and the complementary second set of recesses can have a cross section that is a circle, oval, ellipse, square, regular or irregular polygon, or any combination thereof.

While the set of projections 182 is illustrated, by way of example, as having four (4) projections, any non-zero number of projections are contemplated.

A total thickness 190 of the containment assembly 144 can be measured from the first outer surface 170 to the second inner surface 176. The total thickness 190 can be measured radially along a direction extending from the axis of rotation 54. The total thickness 190 can be in a range from 2.54 millimeters to 20.32 millimeters. More specifically, the total thickness 190 can be in a range from 5 millimeters to 18 millimeters. The range of the total thickness 190 provides both a weight benefit and a strength benefit.

The first ring 146 can have a first minimum thickness 192, which is the smallest thickness when measured radially along a direction extending from the axis of rotation 54. A first maximum thickness 194 is the greatest thickness measured radially along a direction extending from the axis of rotation 54 and is located at a farthest extending portion 196. Therefore, the thickness of the first ring 146 can be between 0.20 millimeters and 7.65 millimeters. More specifically, the thickness of the first ring 46 can be between 0.5 millimeters and 5.5 millimeters.

Similarly, the second ring 148 can have a second minimum thickness 198, which is the smallest thickness when measured radially along a direction extending from the axis of rotation 54. A second maximum thickness 200 is the greatest thickness measured radially along the axis of rotation 54. Therefore, the thickness of the second ring 148 can be between 0.2 millimeters and 7.65 millimeters. More specifically, the thickness of the first ring 146 can be between 0.5 millimeters and 5.5 millimeters.

The location of the first minimum thickness 192 and the second maximum thickness 200 can abut one another. Similarly, the first maximum thickness 194 and the second minimum thickness 198 can be located at the same circumferential position.

A boundary 204 is illustrated in dotted lines that would form the boundary between the first ring 146 and the second ring 148 if the first ring 146 and the second ring 148 were smooth and included no recesses or projections. It is contemplated that the set of projections 182 can extend past the boundary 204 into the second ring 148 a first distance 206 that in a range from 0% to 50% of the total thickness 190. Benefits of the range of the first distance 206 can include an increased in energy dissipated by the containment assembly 144, while maintaining desired thicknesses of the first ring 146 and the second ring 148.

The set of projections 182 can include a first arc length measured between circumferential boundaries 207, 208. That is the first arc length is the arc length along the boundary 204 between the circumferential boundaries 207, 208. An angle 210 can be measured between radii connecting the axis of rotation 54 and each of the circumferential boundaries 207, 208. A sum of the first arc lengths of the plurality of projections can be greater than 10% of a circumference measured at the second inner surface 176 of the second ring 148 or a circumference measured at the first outer surface 170 of the first ring 146.

A second arc length can be measured between circumferential boundaries 212, 214. That is the second arc length is the arc length along or including the farthest extending portion 196 and the circumferential boundaries 212, 214. The farthest extending portion 196 is illustrated, by way of example, as a portion of one or more projections of the set of projections 182 that extends the farthest from the boundary 204 into the first ring 146. The second arc length is measured at the farthest extending portion 196 between the circumferential boundaries 212, 214, where the circumferential boundaries 212, 214 are radii that extend from a center point illustrated as the axis of rotation 54.

While illustrated as having the same angle 210 formed by radii connecting the axis of rotation 54 and each of the circumferential boundaries 212, 214, it is contemplated that the angle for the second arc length can be different than the angle 210 of the first arc length. A ratio of the first arc length to the second arc length can be equal to or between 1:2 and 2:1.

Each first arc length of each projection of the plurality of projections can be within 10% of the other first arc lengths of the plurality of projections. That is, the first arc length of each projection of the plurality of projections can be generally equal.

While illustrated as having the first ring 146 and the second ring 148, any number of rings are contemplated. Optionally, a third ring 179 can couple to or be additively manufactured with or on the second ring 148. The third ring 179 can include a third material. The third material can be different than the second material, the first material, or both the first material and the second material. While illustrated at the second inner surface 176 of the second ring 148, alternatively, in another different example, it is contemplated that the third ring 179 can be coupled to one or more portions of the first ring 146 or the second outer surface 174.

Figure 5:
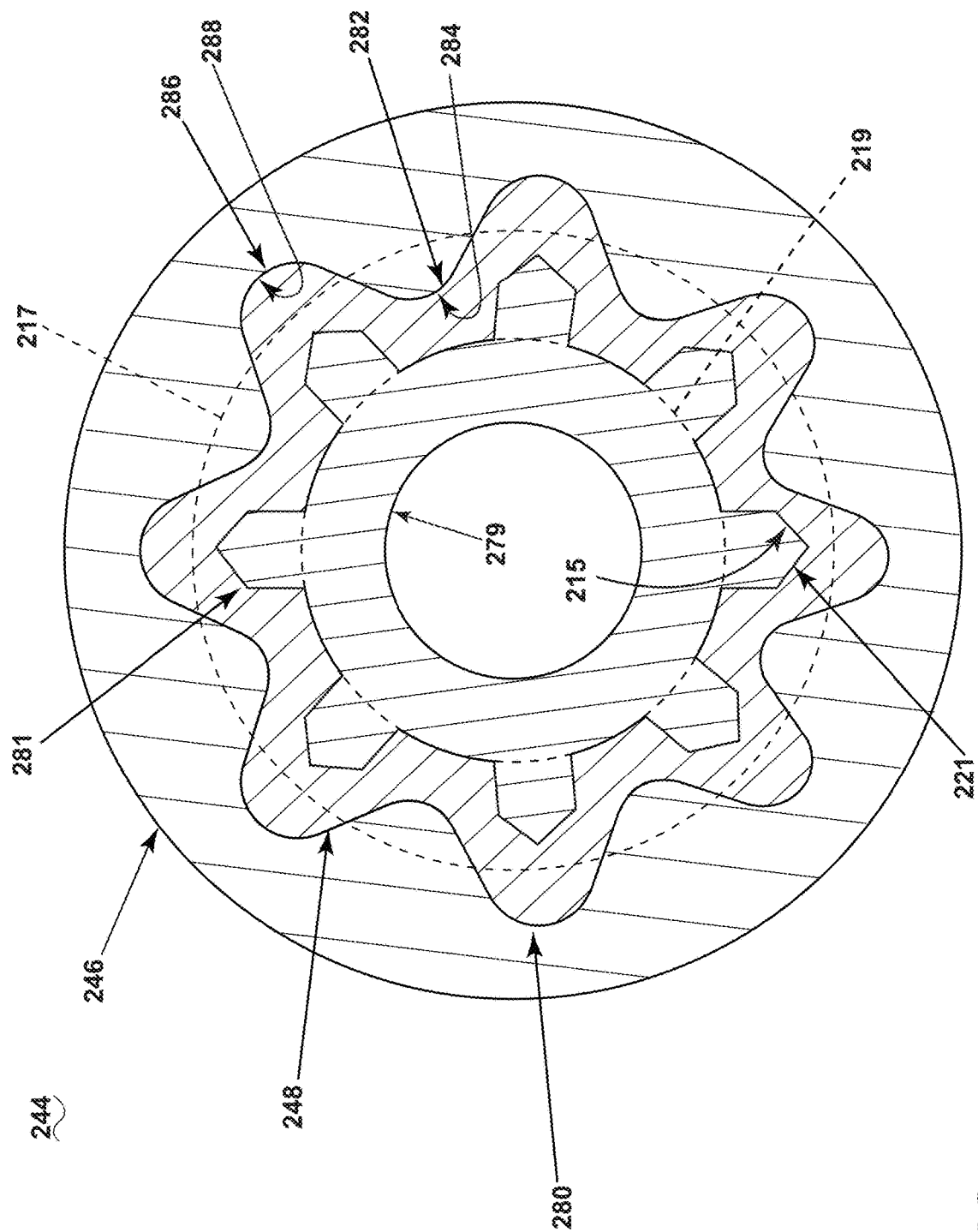
FIG. 5 is another variation of the schematic cross-sectional view of FIG. 3, in accordance with various aspects described herein.

FIG. 5 is another variation of the cross section of FIG. 3 illustrating a containment assembly 244. The containment assembly 244 is similar to the containment assembly 44, 144, and, therefore, like parts will be identified with like numerals further increased by one hundred (100), with it being understood that the description of the like parts of containment assembly 44, 144 applies to the containment assembly 244, unless otherwise noted.

The containment assembly 244 includes a first ring 246, a second ring 248, and a third ring 279. While illustrated as having three rings, two or more rings are contemplated. By way of example, the second ring 248 is concentrically arranged within the first ring 246, while the third ring 279 is concentrically arranged within the second ring 248. It is contemplated in different and non-limiting examples, that the first ring 246 can be concentrically arranged within the second ring 248 or the third ring 279.

A first mechanical surface interlock 280 secures the first ring 246 and the second ring 248 together. As illustrated, by way of non-limiting example, the mechanical surface interlock 280 can includes a first set of projections 282 received by a first set of recesses 284 and a second set of projections 288 received by a second set of recesses 286. The first set of projections 282 and the second set of projections 288 can form a curved shape or sinusoidal boundary between the first ring 246 and the second ring 248.

A boundary 217 is illustrated in dotted lines that would form the boundary between the first ring 246 and the second ring 248 if the first ring 246 and the second ring 248 were smooth and included no recesses or projections.

Optionally, the boundary 217 can be defined at a location where the first ring 246 and the second ring 248 would abut with smooth surfaces and maintain a constant area or area within 20% of the area of the first ring 246 and second ring 248 with recesses or projections.

A second mechanical surface interlock 281 secures the second ring 248 and the third ring 279 together. As illustrated, by way of non-limiting example, the mechanical surface interlock 281 can includes projections 215 received by recesses 221.

While illustrated as having the same or similar shape, each projection of the projections 215 can have a different size or shape, wherein the shape can be any circle, oval, polygon, irregular polygon, or combination thereof.

A boundary 219 is illustrated in dotted lines that would form the boundary between the second ring 248 and the third ring 279 if the second ring 248 and the third ring 279 were smooth and included no recesses or projections. Optionally, the boundary 219 can be located between the second ring 248 and the third ring 279 at a location indicative of removing the projections 215 from the third ring 279 and filling in the recesses 221 of the second ring 248.

Figure 6:
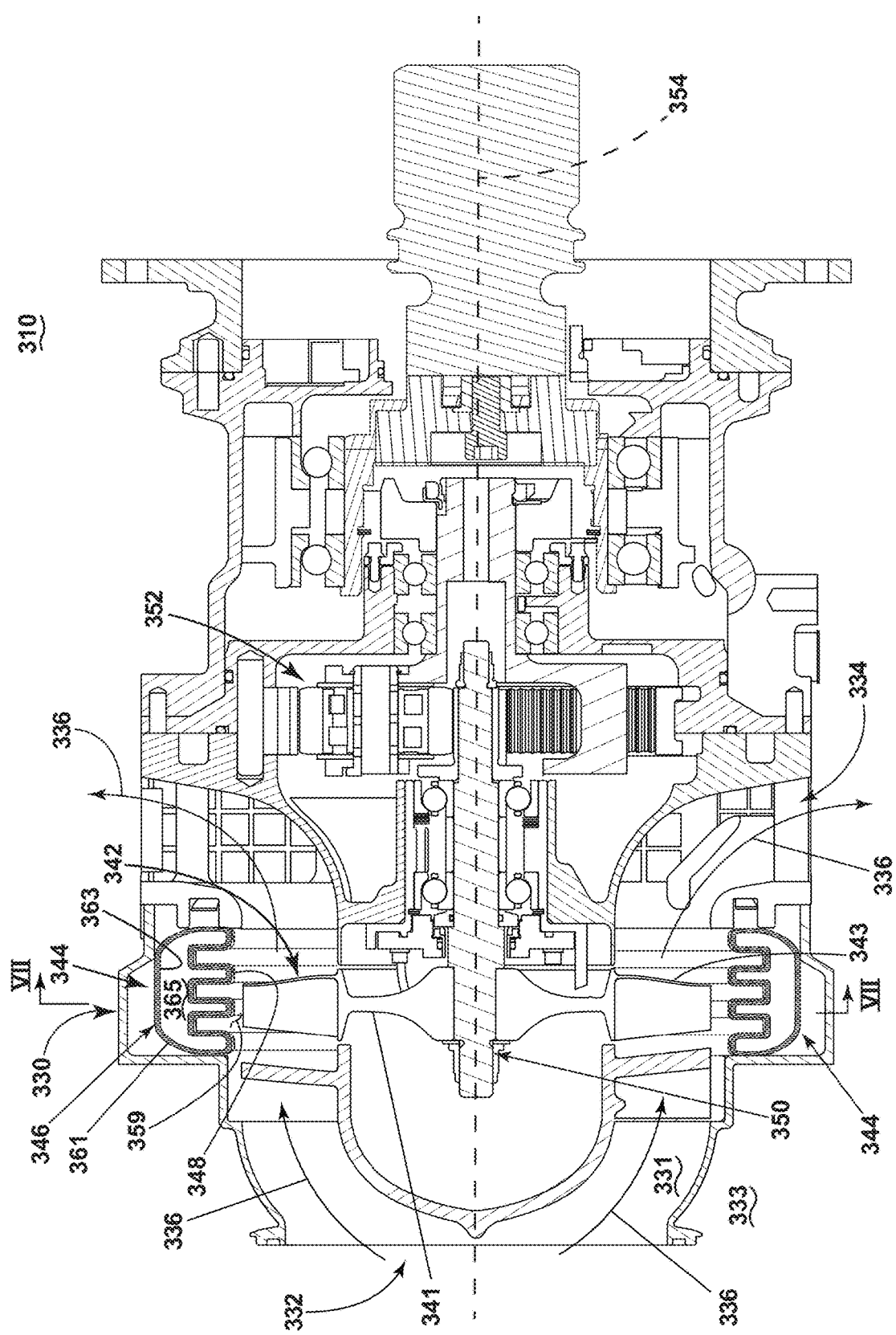
FIG. 6 is variation of the schematic cross-sectional view of FIG. 2 illustrating a schematic cross-sectional view of a portion of the air turbine starter of FIG. 1 having a containment assembly, in accordance with various aspects described herein.

FIG. 6 is another example of a schematic cross section of an air turbine starter 310 that can be used with the turbine engine 14 (FIG. 1). The air turbine starter 310 is similar to the air turbine starter 10 (FIG. 2), therefore, like parts will be identified with like numerals increased by three hundred (300), with it being understood that the description of the like parts of the air turbine starter 10 applies to the air turbine starter 310, unless otherwise noted.

Generally, the air turbine starter 310 includes a housing 330 defining an interior 331 and an exterior 333 of the housing 330. An inlet 332 and an outlet 334 can also be defined by the housing 330. The primary air flow path 336 through the interior 331 is illustrated schematically with arrows. The primary air flow path 336 extends between the inlet 332 and the outlet 334 for communicating a flow of fluid, including, but not limited to gas, compressed air, or the like, there through.

The turbine member 342 is located within the interior 331 of the housing 330. At least a portion of the turbine member 342 is disposed within the primary air flow path 336 for rotatably extracting mechanical power from the flow of gas along the primary air flow path 336. The turbine member 342 includes a rotor portion 341 and a plurality of circumferentially spaced blades 343.

A containment assembly 344 is disposed in the housing 330 surrounding at least a portion of the turbine member 342. More specifically, the containment assembly 344 circumscribes at least a portion of the plurality of circumferentially spaced blades 343 of the turbine member 342. The containment assembly 344 includes a first ring illustrated as an annular hollow tube 346 and a second ring illustrated as a laminate 348.

The hollow tube 346 has an exterior surface 361 and an interior surface 363. A cavity 365 is at least partially bound by the interior surface 363 of the hollow tube 346. The hollow tube 346 can have a cross-sectional shape that is a hollow circle, oval, ellipse, square, regular polygon, irregular polygon or combination thereof.

The hollow tube 346 includes a first material. The first material can be light weight, high strength material. The first material can include, but is not limited to, one or more of titanium, nickel, chromium, iron (steel), or carbon.

The laminate 348 includes a second material, where the second material can be different than the first material. The second material can be a high strength material. The second material can include, but is not limited to, one or more of nickel, cobalt, phosphorus, titanium, chromium, aluminum, zinc, silver, palladium, or tantalum. It is contemplated that the second ring includes nickel, cobalt, and phosphorus.

A gap 359 is located between the laminate 348 and the plurality of circumferentially spaced blades 343. The gap 359 can change based on environmental or operational factors. During a contact event, the gap 359 distance is zero and one or more portions of the plurality of circumferentially spaced blades 343 contacts the containment assembly 344.

Figure 7:
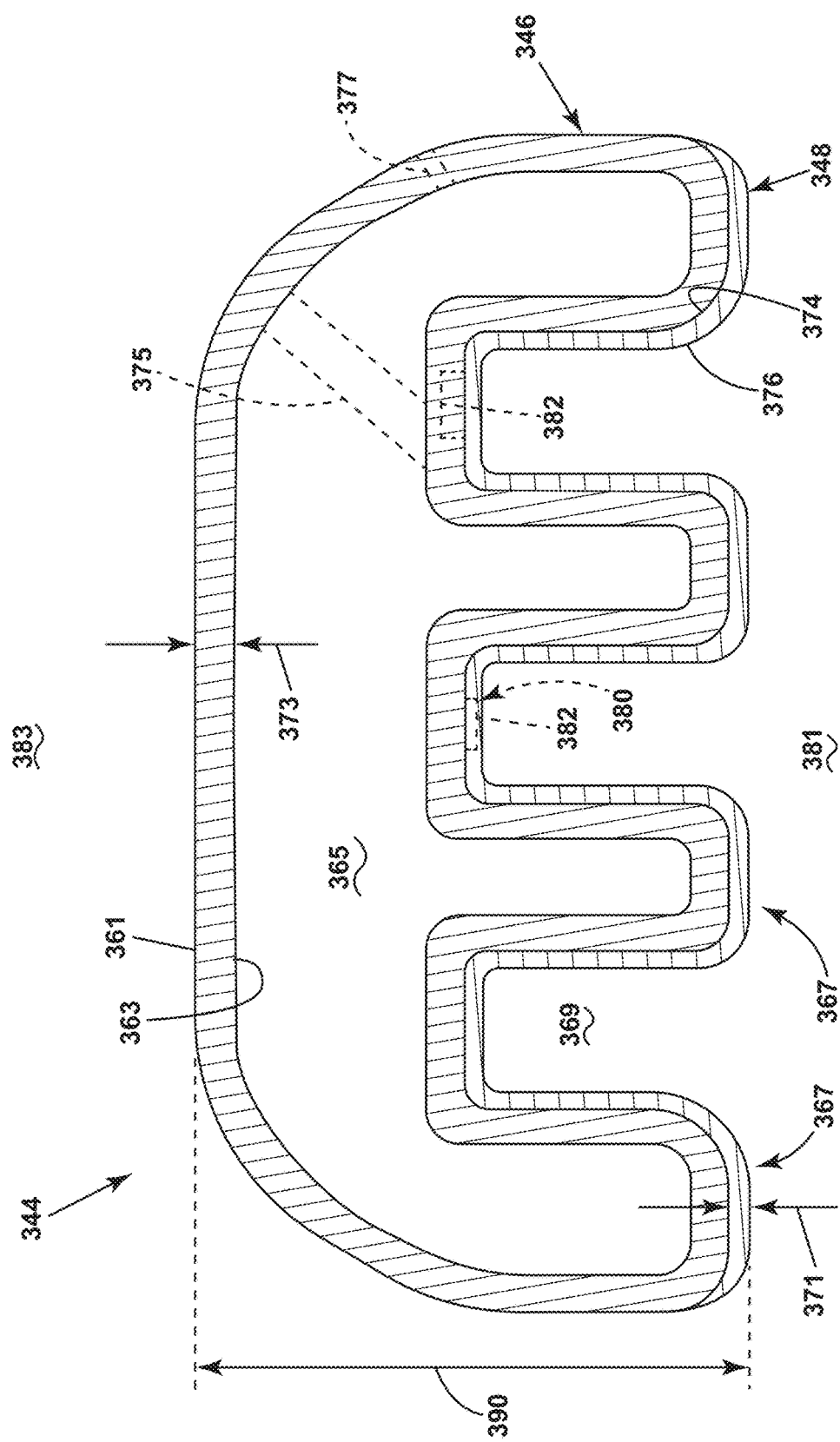
FIG. 7 is an enlarged view of the containment assembly of FIG. 6, in accordance with various aspects described herein.

FIG. 7 is a schematic enlargement of the cross-section of the containment assembly 344 of FIG. 6. While illustrated as having the first ring illustrated as the hollow tube 346 and the second ring illustrated as the laminate 348, any number of rings in the containment assembly 344 are contemplated.

While any shape is contemplated, the containment assembly 344 can have a plurality of protrusions 367 defining one or more recesses, illustrated as a plurality of recesses 369, between each pair of protrusions of the plurality of protrusions 367. As illustrated, by way of example, the cavity 365 can extend into the plurality of protrusions 367. That is, at least a portion of the plurality of protrusions 367 can be hollow. It is further contemplated that at least a portion of the containment assembly 344 can geometrically complement one or more of the plurality of blades 343 (FIG. 6) or the housing 330 (FIG. 6).

The laminate 348 includes an outer surface 374 and an inner surface 376 spaced radially inward from the outer surface 374. A laminate thickness 371 can be measured from the outer surface 374 to the inner surface 376. While illustrated as generally uniform, it is contemplated that the laminate thickness 371 can vary throughout the containment assembly 344. The laminate thickness 371 can be between 0.19 millimeters and 1.99 millimeters. More specifically, the thickness of the laminate 348 can be between 1 millimeter and 1.99 millimeters.

The laminate 348 can be a coating formed or layered on a portion of the hollow tube 346 using, for example, additive manufacturing. By way of non-limiting example, the laminate 348 can be achieved by electrodeposition onto a portion of the hollow tube 346. That is, the laminate 348 can be formed on or secured to part of the hollow tube 346 by way of electroforming. While described as electroforming, any additive manufacturing process or material layering process is contemplated.

A portion of the exterior surface 361 of the hollow tube 346 confronts the outer surface 374 of the laminate 348. The geometry of the outer surface 374 is complementary to the exterior surface 361. Optionally, a mechanical surface interlock 380, similar to the mechanical surface interlocks 80, 180 (FIG. 3 and FIG. 4), can secure the hollow tube 346 and the laminate 348 together. The geometries of the of the exterior surface 361 and the outer surface 374 can include a variety of projections and recesses. As illustrated, by way of non-limiting example, the mechanical surface interlock 380 can include tabs, illustrated as tabs 382 extending from the exterior surface 361 of the hollow tube 346 or the outer surface 374 of the laminate 348. Indentations or recesses at the outer surface 374 or the exterior surface 361 receive the tabs 382.

A total radial thickness 390 of the containment assembly 344 is measured at the greatest radial span of the containment assembly 344. As illustrated, by way of example, the total radial thickness 390 can be measured from the inner surface 376 of the laminate 348 to a radially outward side 383 of the exterior surface 361 of the hollow tube 346.

The total radial thickness 390 can be between 2.54 millimeters and 20.32 millimeters. More specifically, the total radial thickness 390 can be between 5 millimeters and 18 millimeters. Additionally, or alternatively, the total radial thickness 390 can be between 0.1% and 50% of an outer diameter 391 (see FIG. 8). It is further contemplated that the laminate thickness 371 can be in a range from 0.1% to 80% of the total radial thickness 390. It is yet further contemplated that the laminate thickness 371 can be in a range from 1% to 50% of the total radial thickness 390. The range of the laminate thickness 371 provides both a weight benefit and a strength benefit.

The first ring illustrated as the hollow tube 346 can have a first ring thickness 373 can be measured from the exterior surface 361 to the interior surface 363. While illustrated as generally uniform, it is contemplated that the first ring thickness 373 can vary throughout the containment assembly 344. The first ring thickness 373 can be between 0.20 millimeters and 7.65 millimeters. More specifically, the first ring thickness 373 of the hollow tube 346 can be between 0.5 millimeters and 5.5 millimeters.

The cavity 365 can contain ambient air, pressurized air, any known fluid (including gaseous or liquid fluids) or any combination thereof. Optionally, the cavity 365 can contain mesh or support structures 375. The support structures 375 can extend across a portion of the cavity 365 and connect portions of the interior surface 363.

Alternatively, in a different and non-limiting example, the cavity 365 can contain a solid, energy absorbing material.

By way of example, the cavity 365 can be fluidly isolated from the interior 331 (FIG. 6) of the air turbine starter 310 (FIG. 6). Alternatively, in a different and non-limiting example, the cavity 365 can include one or more apertures 377 fluidly coupling the cavity 365 with the interior 331 of the air turbine starter 310. In yet another different and non-limiting example, the one or more apertures 377 can fluidly connect the cavity 365 with the housing 330 (FIG. 6), a bleed airflow (not shown), or a cooling airflow (not shown). It is contemplated that the bleed airflow (not shown), a cooling airflow (not shown), or other fluid coupling can provide a cooling fluid to the cavity 365. It is further contemplated that the fluid pressure in the cavity 365 can be controlled by fluidly coupling to one or more portion of the interior 331 or fluid coupling to a source providing a pressurized fluid flow.

Figure 8:
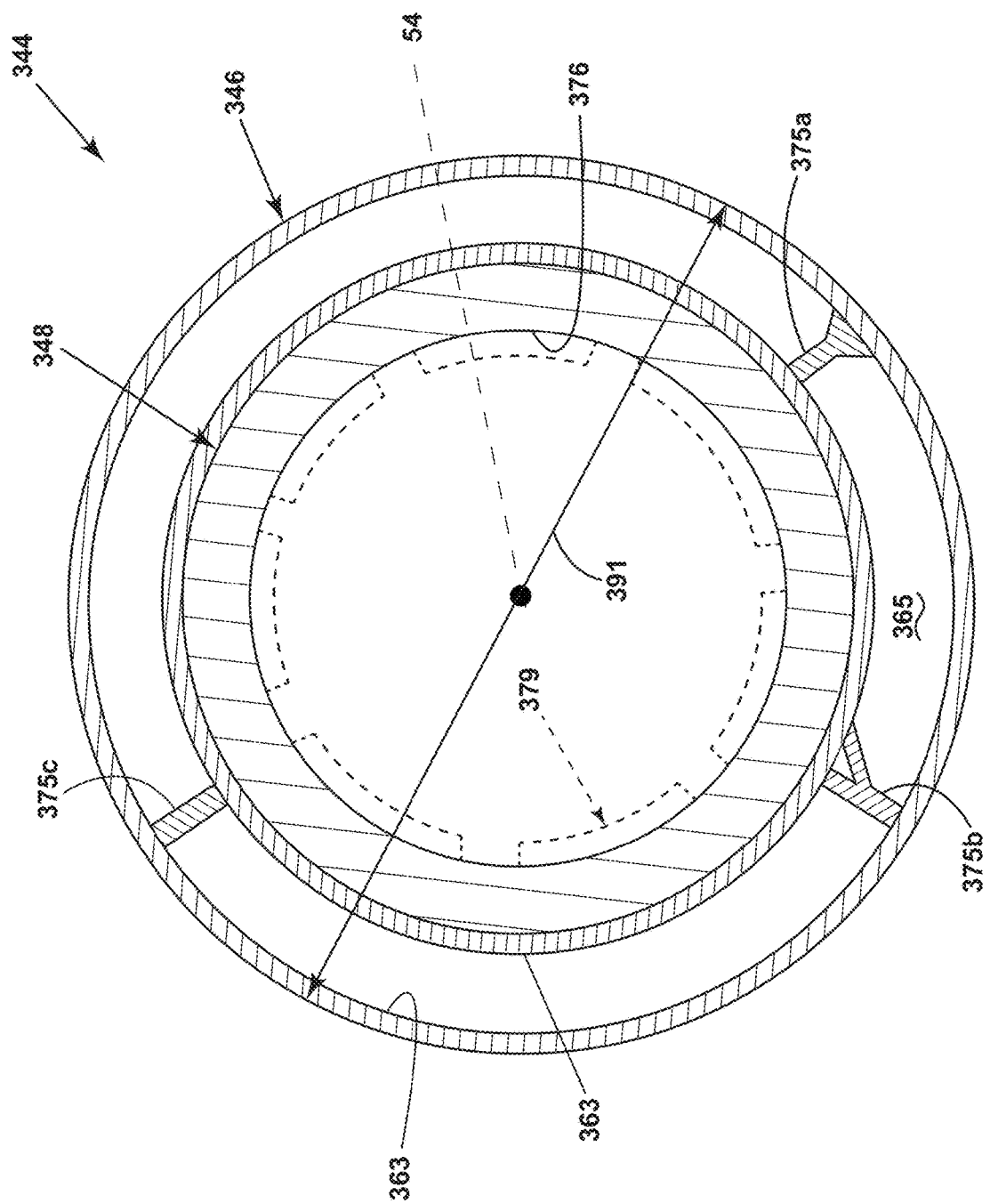
FIG. 8 is a schematic cross-sectional view of the containment assembly taken along line VII-VII of FIG. 6, in accordance with various aspects described herein.

FIG. 8 is a schematic cross-sectional view further illustrating the containment assembly 344 having the hollow tube 346 and the laminate 348. The optional support structures are illustrated as a set of support structure 375a, 375b, 375c. Each support structure of the set of support structures 375a, 375b, 375c can have a varying shape or thickness. The set of support structures 375a, 375b, 375c, while illustrated as extending radially, can additionally or alternatively extend axially.

The laminate 348, by way of example, is a continuous annular ring. The continuous annular ring formed by the laminate 348 can be located at a radially inner portion or a radially inner side 381 of the hollow tube 346.

As shown in FIG. 8, the outer diameter 391 of the containment assembly 344 can be measured across the containment assembly 344 through the axis of rotation 54. While shown as uniform, the outer diameter 391 can vary. That is, the containment assembly 344, while illustrated as a circle, can be an oval or have varying outer diameters.

Optionally, a third ring 379 can couple to or be additively manufactured with or on the laminate 348. The third ring 379 can include a third material. The third material can be different than the second material, the first material, or both the first material and the second material. By way of non-limiting example, the third material can include one or more of nickel, cobalt, phosphorus, titanium, chromium, aluminum, zinc, silver, palladium, or tantalum. While illustrated as having circumferentially discrete pieces, it is contemplated that the third ring 379 can be continuous about the inner surface 376 of the laminate 348.

Referring to FIG. 6, FIG. 7, and FIG. 8, during operation, if a contact event occurs between an object and the containment assembly 344, the containment assembly 344 can dissipate energy from the object. The first material and the second material can be selected based on material properties to help absorb the energy from the object. During contact, energy of the object is dissipated by compression, release of compressed gas, or deformation of the cavity 365. Further, it is contemplated that the plurality of protrusions 367 can be compressed or deformed absorbing additional energy from the object during contact. Energy dissipation can also occur by means of shear between the first material and the second material.

Optionally, the mechanical surface interlock 380 can serve as a load-carrying member. That is, forces resulting from the energy of the contact of the object provided to the containment assembly 344 can be at least partially directed to the mechanical surface interlock 380, wherein the mechanical surface interlock 380 can bend, curve, compress, stretch, or otherwise deform.

Figure 9:
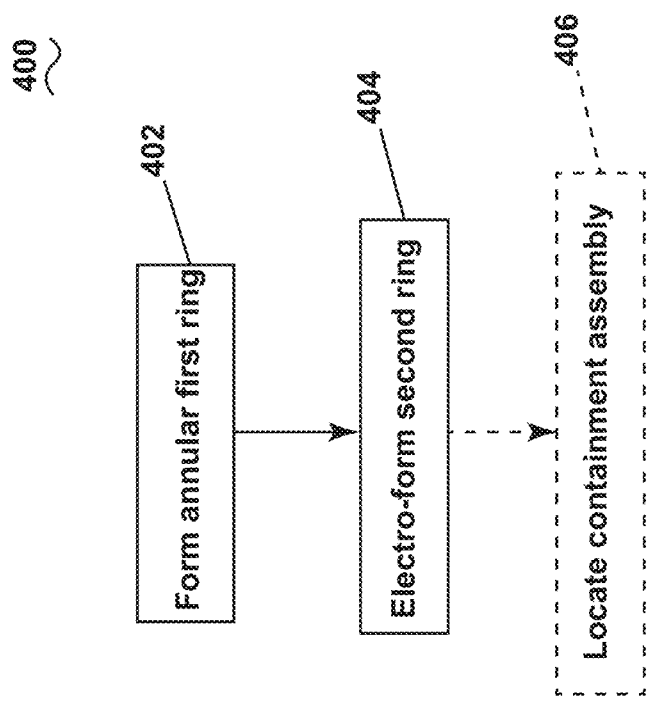
FIG. 9 illustrates a flowchart of a method of forming a containment assembly for an air turbine starter in accordance with various aspects described herein.

FIG. 9 illustrates a method 400 of forming the containment assembly 44, 144, 344 for an air turbine starter 10, 310. At 402, an annular first ring is formed, where the annular first ring can be the first ring 46, 146, or the hollow tube 346. The annular first ring includes titanium, a nickel superalloy, or a combination thereof. The plurality of protrusions 367 and the plurality of recesses 369 can be formed with the first ring 46, 146, or the hollow tube 346. Optionally, the plurality of protrusions 367 and the plurality of recesses 369 can be formed at the radially inner surface 372 or the first inner surface 72, 172.

At 404, the second ring 48, 148, or laminate 348 is electro-formed to the annular first ring formed at 402. The second ring 48, 148, or laminate 348 can be electro-formed at the radially inner surface 376 of the hollow tube 346, or the first inner surface 72, 172 of the first ring 46, 146. The second ring 48, 148, or laminate 348 can include nickel, cobalt, and phosphorus.

The second ring 48, 148, or laminate 348 can be electro-formed on the plurality of protrusions 367 and the plurality of recesses 369. Alternatively, in another non-limiting and different example, the second ring 48, 148, or laminate 348 is electro-formed or deposited on a portion of the plurality of protrusions 367 or the recesses 369. The electroforming of the second ring 48, 148, or laminate 348 can be electrodeposition. The second ring thickness 98, 100, 371 can be in a range from 0.20 millimeters to 7.65 millimeters. More specifically, the second ring thickness 98, 100, 371 can be in a range from 0.5 millimeters to 5.5 millimeters. The selected range allows for the desired energy dissipation, while remaining within the desired weight; providing a benefit of both improved energy dissipation and decreased weight.

Optionally, at 406, the containment assembly 44, 144, 344 can be located at an interior 31, 331 of the air turbine starter 10, 310. The containment assembly 44, 144, 344 at least partially circumscribes the turbine member 42, 342. The housing 30, 330 of the air turbine starter 10, 310 can receive or be coupled to the containment assembly 44, 144, 344.

Figure 10:
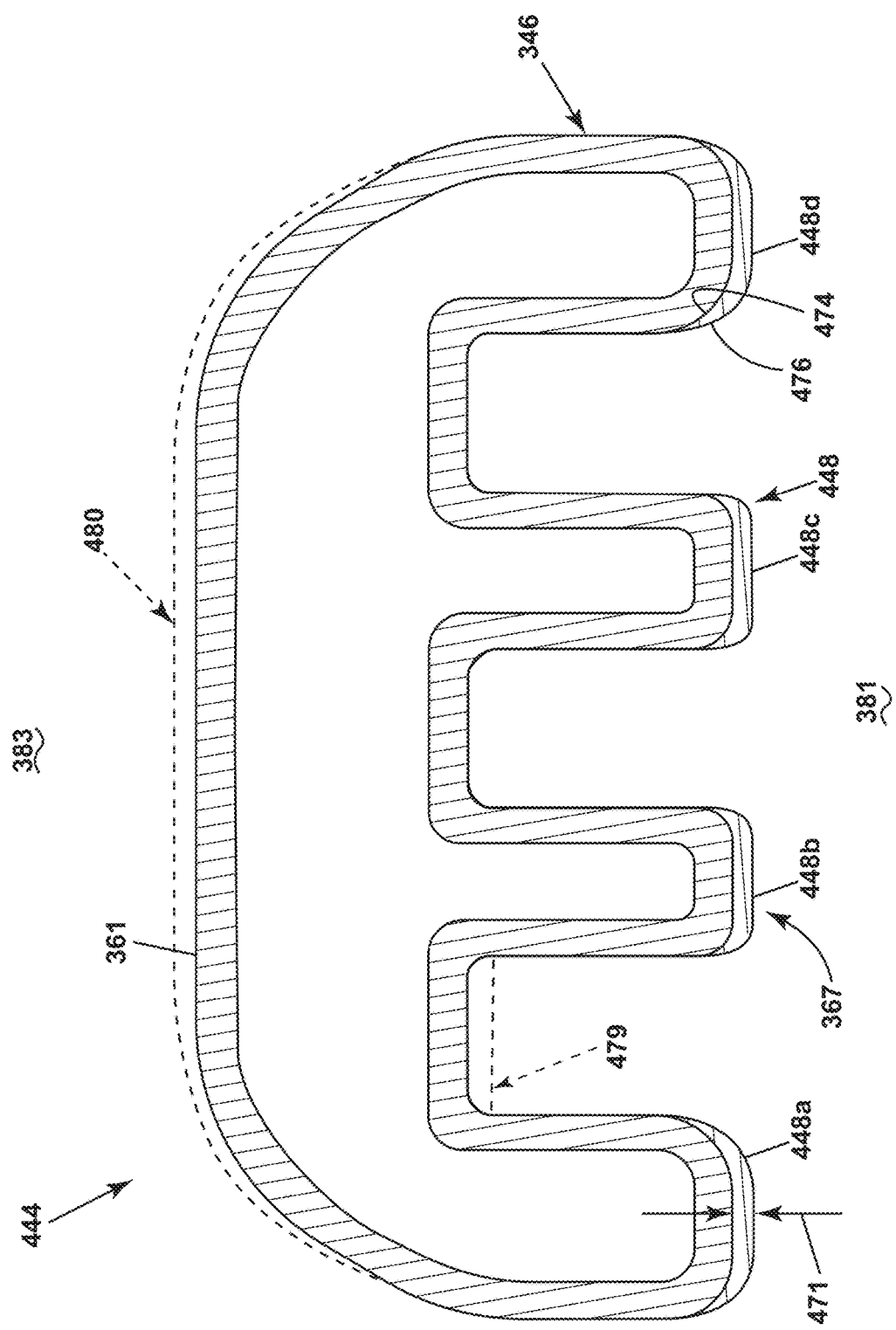
FIG. 10 is a variation of the schematic cross-sectional view of the containment assembly of FIG. 8, in accordance with various aspects described herein.

FIG. 10 is another example of a schematic cross-sectional view further illustrating a containment assembly 444 having the hollow tube 346 and a laminate 448. The laminate 448 is similar to the laminate 348 (FIG. 8), therefore, like parts will be identified with like numerals further increased by one hundred (100), with it being understood that the description of the like parts of the laminate 348 applies to the laminate 448, unless otherwise noted.

The laminate 448 can be discontinuous, illustrated as a coating on the radially inner side 381 of the exterior surface 361 of the hollow tube 346. By way of non-limiting example, the laminate 448 can be used as a laminate on one or more portions of the plurality of protrusions 367. That is, the laminate 448 can be, by way of non-limiting example, a series of axially spaced annular rings 448a, 448b, 448c, 448d coupled to or laminated on the hollow tube 346.

By way of another different and non-limiting example, the laminate 448 can be a series of circumferentially spaced rings (not shown) coupled to or laminated on one or more portions of the hollow tube 346.

The second ring thickness 471 can be measured radially between an outer surface 474 and an inner surface 476. While the second ring thickness 471 can vary, the second ring thickness 471 of at least a portion of the laminate 448 is in a range from 0.02 millimeters to 7.65 millimeters. More specifically, second ring thickness 471 can be in a range from 0.05 millimeters to 5.5 millimeters. The second ring thickness 471 range provides both a weight benefit and a strength benefit.

Optimally, a third ring 479 can couple to or be applied to a portion of the exterior surface 361 of the hollow tube 346. It is further contemplated that the third ring 379 can be axially located between the series of axially spaced annular rings 448a, 448b, 448c, 448d. That is, the third ring 479, while illustrated as a single ring, can be one or more axially spaced rings, where the third rings 479 can be located between two or more of the series of axially spaced annular rings 448a, 448b, 448c, 448d that define the laminate 448.

Alternatively, in a different and non-limiting example, the third ring 479 can be formed with, formed on, or coupled to one or more of the series of axially spaced annular rings 448a, 448b, 448c, 448d.

Additional laminates or additional rings 480 can be applied to one or more portions of the exterior surface 361 of the first ring 346. The additional rings 480 are illustrated as a continuous ring, however, any number of rings or ring segments are contemplated.

Benefits of the first material and second material (opposed to a single material) include a reduced weight when compared to traditional containment assembly design.

The cavity defined by the interior surface of the first ring (or hollow tube) can further provide a weight benefit.

The containment assemblies described herein provide the benefit of having multiple forms of energy dissipation. The mechanical surface interlock bends, curves, compresses, stretches, deforms, transfers force, or any combination thereof to dissipate energy during a contact event.

Ranges for protrusions and recesses provide just enough of the first ring, the second ring, or the third ring projecting into another of the first ring, the second ring, or the third ring to dissipate energy in the fit between the rings.

The prestressed second material of the second ring can dissipate energy by relieving the prestress of the second material of the second ring.

The cavity can compress, transfer force, stretch, deform, or any combination thereof to dissipate energy during a contact event. Further, the fluid in the cavity can compress to dissipate energy of an object.

The use of the first material and the second material can provide additional energy dissipation via the interference, thermal fit, shear, or any combination thereof between the first material and the second material.

Further aspects are provided by the subject matter of the following clauses:

An air turbine starter comprising a housing defining an interior, wherein the housing includes a primary inlet and a primary outlet to define a primary air flow path from the primary inlet to the primary outlet, a rotatable turbine member comprising a plurality of circumferentially spaced blades extending into the primary air flow path, and a containment assembly coupled to the housing and circumscribing at least a portion of the plurality of circumferentially spaced blades, the containment assembly comprising a first ring, a second ring concentrically arranged with the first ring, and a mechanical surface interlock securing together the first ring and the second ring.

A turbine engine comprising a fan, a compression region, a combustion chamber, and a turbine region, and an air turbine starter operably coupled to the compression region or the turbine region, the air turbine starter comprising a housing defining an interior having a primary inlet and a primary outlet to define a primary air flow path from the primary inlet to the primary outlet, a rotatable turbine member comprising a plurality of circumferentially spaced blades extending into the primary air flow path, and a containment assembly coupled to the housing and circumscribing at least a portion of the plurality of circumferentially spaced blades, the containment assembly comprising a first ring, a second ring concentrically arranged with the first ring, and a mechanical surface interlock securing together the first ring and the second ring.

An air turbine starter comprising a housing defining an interior, wherein the housing includes a primary inlet and a primary outlet to define a primary air flow path from the primary inlet to the primary outlet, a rotatable turbine member comprising a plurality of circumferentially spaced blades extending into the primary air flow path, and a containment assembly located in the interior and circumscribing at least a portion of the plurality of circumferentially spaced blades, the containment assembly comprising a hollow tube coupled to the housing and comprising a first material, wherein the hollow tube includes an exterior surface and an interior surface spaced from the exterior surface, and a laminate comprising a second material different from the first material, wherein the laminate is applied to a radially inner side of the exterior surface of the hollow tube.

An air turbine starter comprising a housing defining an interior having a primary inlet and a primary outlet to define a primary air flow path from the primary inlet to the primary outlet, a rotatable turbine member comprising a plurality of circumferentially spaced blades extending into the primary air flow path, and a containment assembly coupled to the housing and circumscribing at least a portion of the plurality of circumferentially spaced blades, the containment assembly comprising a first ring defining an annular hollow tube, a second ring concentrically arranged with the first ring, wherein the second ring is laminate applied to a radially inner portion of the hollow tube, and a mechanical surface interlock securing together the hollow tube and the laminate.

The air turbine starter of any preceding clause, wherein the first ring comprises a first material and the second ring comprises a second material that is different than the first material.

The air turbine starter of any preceding clause, wherein the first material or the second material includes one or more of titanium, nickel, chromium, iron, or carbon.

The air turbine starter of any preceding clause, wherein the second ring is compressed or prestressed.

The air turbine starter of any preceding clause, wherein between 1% and 30% of energy of an object brought into contact with the second ring is dissipated through the transfer of energy from the object to the second ring to relieve the compression or prestress.

The air turbine starter of any preceding clause, wherein the mechanical surface interlock between the first material and the second material is an interference fit achieved by geometries of the mechanical surface interlock.

The air turbine starter of any preceding clause, wherein the mechanical surface interlock between the first material and the second material is an interference fit achieved by thermal fit.

The air turbine starter of any preceding clause, wherein the mechanical surface interlock is a set of projections received by a set of recesses geometrically complementary to the set of projections.

The air turbine starter of any preceding clause, wherein the set of projections and the set of recesses are thermally fit, wherein one or more of the first ring or the second ring are heated prior to interlocking the geometries of the set of projections and the set of recesses.

The air turbine starter of any preceding clause, wherein the containment assembly includes a total thickness measured from a second inner surface of the second ring to a first outer surface of the first ring or measured from a radially inner side of the containment assembly to a radially outward side of the containment assembly.

The air turbine starter of any preceding clause, wherein the total thickness of the containment assembly is in a range from 2.54 millimeters to 20.32 millimeters.

The air turbine starter of any preceding clause, wherein each projection of the set of projections extends past a boundary a first distance that is between 0% and 50% of the total thickness, wherein the boundary is defined at a location where the first ring and the second ring would abut with smooth surfaces and where the area of the first ring and the second ring with smooth surfaces is within 20% of the area of the first ring and second ring, respectively, with recesses or projections.

The air turbine starter of any preceding clause, wherein the first ring has a first thickness measured from a first inner surface to the first outer surface and the second ring has a second thickness measured from the second inner surface to a second outer surface, and wherein each projection of the set of projections extends past a boundary a first distance that is less than 70% of the first thickness or the second thickness.

The air turbine starter of any preceding clause, wherein each projection of the set of projections includes a first arc length measured along a boundary and a second arc length measured along or including a farthest extending portion of the projection.

The air turbine starter of any preceding clause, wherein a sum of the first arc length of each projection of the plurality of projections is greater than 10% of a circumference measured at a second inner surface of the second ring or a first outer surface of the first ring.

The air turbine starter of any preceding clause, further comprising a third ring comprising a third material, wherein the third ring is concentrically arranged with the second ring.

The air turbine starter of any preceding clause, wherein the third material is different from the first material and the second material.

The air turbine starter of any preceding clause, wherein the mechanical surface interlock has a saw-toothed pattern.

The air turbine starter of any preceding clause, wherein the mechanical surface interlock comprises a first set of projections received by a first set of recesses and a second set of projections received by a second set of recesses, wherein corresponding projections and recesses are geometrically complementary.

The air turbine starter of any preceding clause, further comprising a drive shaft coupled to the turbine member, an output gear assembly rotatably coupled to the drive shaft, wherein the drive shaft provides a rotational output to the output gear assembly, and output shaft operably coupled to the turbine member by the output gear assembly, wherein the output shaft is operably coupled to a turbine engine, wherein the output shaft rotates a portion of the turbine engine.

The air turbine starter of any preceding clause, wherein the first ring or the second ring are circular.

The air turbine starter of any preceding clause, wherein the first material includes titanium or nickel and the second material includes iron.

The air turbine starter of any preceding clause, wherein, during contact by an object, energy of the object is dissipated by interference between surface geometries of the mechanical surface interlock, wherein the mechanical surface interlock bends, curves, compresses, stretches, or otherwise deforms to dissipate the energy of the object.

The air turbine starter of any preceding clause, wherein the laminate is secured, by electroforming, to a radially inner side of the exterior surface.

The air turbine starter of any preceding clause, wherein the first material comprises titanium, nickel, or a combination thereof.

The air turbine starter of any preceding clause, wherein the nickel is a nickel superalloy having chromium.

The air turbine starter of any preceding clause, wherein the second material comprises nickel, cobalt, phosphorus, or combination thereof.

The air turbine starter of any preceding clause, wherein the containment assembly has a radial thickness between 0.1% and 50% of an outer diameter of the containment assembly.

The air turbine starter of any preceding clause, wherein hollow tube has a first ring thickness in a range from 0.2 millimeters to 7.65 millimeters.

The air turbine starter of any preceding clause, wherein at least a portion of the laminate has a thickness measured from an outer surface to an inner surface in a range from 0.2 millimeters to 7.65 millimeters.

The air turbine starter of any preceding clause, wherein at least a portion of the laminate has a thickness measured from an outer surface to an inner surface in a range from 0.2 millimeters and 7.65 millimeters.

The air turbine starter of any preceding clause, wherein the laminate defines a continuous annular ring concentrically arranged with the hollow tube.

The air turbine starter of any preceding clause, wherein the laminate defines a series of axially spaced annular rings.

The air turbine starter of any preceding clause, further comprising a third ring comprising a third material different from the first material and the second material.

The air turbine starter of any preceding clause, wherein the third ring is located between two or more of the series of axially spaced annular rings.

The air turbine starter of any preceding clause, wherein the containment assembly further comprises a plurality of protrusions defining a plurality of recesses.

The air turbine starter of any preceding clause, wherein the laminate defines a series of axially spaced annular rings located at the plurality of protrusions.

The air turbine starter of any preceding clause, further comprising a third ring comprising a third material different from the first material and the second material.

The air turbine starter of any preceding clause, wherein the third ring is additively manufactured and located at an inner surface or an outer surface of the laminate.

The air turbine starter of any preceding clause, wherein the third ring is additively manufactured and located at the exterior surface of the hollow tube.

The air turbine starter of any preceding clause, further comprising support structures that span at least a portion of a cavity defined by an interior surface of the hollow tube.

The air turbine starter of any preceding clause, further comprising one or more apertures that fluidly couple a cavity defined by an interior surface of the hollow tube with the interior of the air turbine starter.

A method of forming a containment assembly for an air turbine starter, the method comprising forming an annular ring comprising titanium, a nickel superalloy, or a combination therein, and electroforming a laminate to a radially inner side of annular ring, the laminate comprising one or more of nickel, cobalt, or phosphorus.

The method of any preceding clause, further comprising, locating the containment assembly within an interior of a housing of the air turbine starter, wherein the containment assembly at least partially circumscribes a turbine member.

The method of any preceding clause, wherein forming the annular ring includes forming a hollow tube.

The method of any preceding clause, wherein the hollow tube includes a plurality of protrusions that define at least one recess at a radially inner surface.

The method of any preceding clause, wherein the laminate is deposited at least on the plurality of protrusions.

The method of any preceding clause, wherein the electroforming the laminate includes electrodeposition.

The method of any preceding clause, wherein the laminate, formed by electrodeposition, has a thickness greater than 0.2 millimeters.

A method of dissipating energy of an object by a containment assembly of an air turbine starter, where the containment assembly is located within a housing of the air turbine starter, the method comprising dissipating energy of the object by directing forces from the object to a mechanical surface interlock between a first ring and a second ring that define the containment assembly and dissipating energy of the object by relieving compression or prestress of the second ring.

The method of any preceding clause, further comprising dissipating energy of the object within the first ring and the second ring, wherein the first ring and the second ring comprise materials with properties capable of absorbing a portion of the energy of the object by converting the energy of the object into shear energy, strain energy, or shear energy and strain energy.

The method of any preceding clause, wherein the dissipating energy of the object by relieving the compression or the prestress of the second ring, includes dissipating a range of 1% to 50% of the energy of the object.

What is claimed is:

1. An air turbine starter comprising:
   a housing defining an interior, wherein the housing includes a primary inlet and a primary outlet to define a primary air flow path from the primary inlet to the primary outlet;
   a rotatable turbine member comprising a plurality of circumferentially spaced blades extending into the primary air flow path; and
   a containment assembly located in the interior and circumscribing at least a portion of the plurality of circumferentially spaced blades, the containment assembly comprising:
      a hollow tube coupled to the housing and comprising a first material, wherein the hollow tube includes an exterior surface and an interior surface spaced from the exterior surface; and
      a laminate comprising a second material different from the first material, wherein the laminate is a series of axially spaced annular rings applied to a radially inner side of the exterior surface of the hollow tube.

2. The air turbine starter of claim 1, further comprising a plurality of recesses defined, at least in part, by the radially inner side of the exterior surface of the hollow tube, wherein each recess of the plurality of recesses is located between two annular rings of the series of axially spaced annular rings.

3. The air turbine starter of claim 1, wherein the series of axially spaced annular rings are secured, by electroforming, to the radially inner side of the exterior surface.

4. The air turbine starter of claim 1, wherein at least a portion of the laminate has a thickness measured from an outer surface to an inner surface in a range from 0.2 millimeters to 7.65 millimeters.

5. The air turbine starter of claim 1, wherein at least a portion of the laminate has a thickness measured from an outer surface to an inner surface in a range from 0.1% to 80% of a total radial thickness of the containment assembly.

6. The air turbine starter of claim 1, further comprising a third ring coupled to the exterior surface of the hollow tube or one or more of the series of axially spaced annular rings.

7. The air turbine starter of claim 6, wherein the third ring is additively manufactured and located at an inner surface or an outer surface of the laminate.

8. The air turbine starter of claim 6, wherein the third ring is additively manufactured and located at the exterior surface of the hollow tube.

9. The air turbine starter of claim 6, wherein the third ring comprises a third material different than the first material and the second material.

10. The air turbine starter of claim 6, wherein the third ring is located between two or more of the series of axially spaced annular rings.

11. The air turbine starter of claim 6, further comprising additional laminates or additional rings applied to one or more portions of the exterior surface of the hollow tube.

12. The air turbine starter of claim 1, wherein the first material comprises titanium, nickel, or a combination thereof.

13. The air turbine starter of claim 12, wherein the nickel is a nickel superalloy having chromium.

14. The air turbine starter of claim 12, wherein the second material comprises nickel, cobalt, phosphorus, or combination thereof.

15. The air turbine starter of claim 1, further comprising a support structure that spans at least a portion of a cavity defined by the interior surface of the hollow tube.

16. The air turbine starter of claim 15, wherein the support structure is a set of support structures, and wherein two or more of the support structures of the set of support structures have different thicknesses.

17. The air turbine starter of claim 1, further comprising a mechanical surface interlock defined by portions of the hollow tube and the laminate.

18. The air turbine starter of claim 17, wherein the mechanical surface interlock includes tabs extending from the exterior surface of the hollow tube received by recesses at an outer surface of the laminate, or tabs extending from the outer surface of the laminate that are received by recesses in the exterior surface of the hollow tube.

19. The air turbine starter of claim 1, wherein a total radial thickness of the containment assembly is measured radially along a direction extending from an axis of rotation, and wherein the total radial thickness is between 2.54 millimeters and 20.32 millimeters.

20. The air turbine starter of claim 1, further comprising one or more apertures that fluidly couple a cavity defined by the interior surface of the hollow tube with the interior of the air turbine starter.

* * * * *